(12) United States Patent
Kolton et al.

(10) Patent No.: US 8,453,937 B2
(45) Date of Patent: Jun. 4, 2013

(54) SECURITY HANG TAG WITH SWIVEL HEAD

(75) Inventors: Chester Kolton, Westfield, NJ (US);
Michael Norman, East Brunswick, NJ (US); Jake Strassburger, South Plainfield, NJ (US)

(73) Assignee: B&G International Inc., Newark, NJ (US)

( * ) Notice: Subject to any disclaimer, the term of this patent is extended or adjusted under 35 U.S.C. 154(b) by 557 days.

(21) Appl. No.: 12/539,183

(22) Filed: Aug. 11, 2009

(65) Prior Publication Data
US 2010/0038431 A1 Feb. 18, 2010

Related U.S. Application Data

(60) Provisional application No. 61/088,561, filed on Aug. 13, 2008.

(51) Int. Cl.
*G06F 17/00* (2006.01)
*G06K 7/10* (2006.01)
*G06K 19/00* (2006.01)
*G06K 19/06* (2006.01)
*G08B 13/14* (2006.01)
*G08B 13/12* (2006.01)

(52) U.S. Cl.
USPC ...... 235/492; 235/375; 235/487; 235/472.02; 340/572.1; 340/568.2; 340/568.1; 340/571; 340/568.4

(58) Field of Classification Search
USPC ............ 340/568.1, 571, 572, 572.8, 572.9, 340/572.1, 568.2, 568.4; 235/487, 492, 472.02, 235/375
See application file for complete search history.

(56) References Cited

U.S. PATENT DOCUMENTS

| | | | | |
|---|---|---|---|---|
| 3,858,280 A | * | 1/1975 | Martens | 70/57.1 |
| 3,932,918 A | * | 1/1976 | Paskert | 70/57.1 |
| 3,947,930 A | * | 4/1976 | Martens et al. | 340/572.7 |
| 4,393,548 A | * | 7/1983 | Herb | 24/16 PB |
| 5,524,463 A | * | 6/1996 | Schenkel et al. | 70/57.1 |
| 5,788,294 A | * | 8/1998 | Leon et al. | 292/307 R |
| 5,945,909 A | * | 8/1999 | Kolton | 340/572.1 |
| 6,102,347 A | * | 8/2000 | Benoit | 248/230.8 |

(Continued)

FOREIGN PATENT DOCUMENTS

| | | |
|---|---|---|
| CN | 2572495 Y | 9/2002 |
| WO | 9840591 | 9/1998 |

OTHER PUBLICATIONS

USS Corporation, "Ultra Grip: The Power of Steel and Technology", www.universalea.com; Published 2004.

*Primary Examiner* — Daniel Walsh
(74) *Attorney, Agent, or Firm* — Hoffmann & Baron, LLP

(57) ABSTRACT

Disclosed herein is a security hang tag that includes a body, a head and a strap. The body includes a head-receiving compartment defining a circumferentially-extending flange. The head includes a circumferentially-extending lip to engage the flange, capturing the lip within the compartment such that the head is rotatably secured to the body. The head has a first strap-receiving channel including a first locking shoulder and a second strap-receiving channel including a second locking shoulder. The strap has first and second ends and includes a first cavity at the first end and a second cavity at the second end. The first end is configured for insertion within the first strap-receiving channel until the first cavity engages the first locking shoulder and the second end is configured for insertion within the second strap-receiving channel until the second cavity engages the second locking shoulder.

17 Claims, 20 Drawing Sheets

U.S. PATENT DOCUMENTS

| | | | |
|---|---|---|---|
| 6,188,320 B1 * | 2/2001 | Kolton et al. | 340/572.9 |
| 6,624,753 B2 * | 9/2003 | Elston | 340/572.8 |
| D492,215 S * | 6/2004 | Lu | D10/106.94 |
| 6,933,847 B2 * | 8/2005 | Feibelman | 340/572.1 |
| 7,183,914 B2 * | 2/2007 | Norman et al. | 340/568.1 |
| 7,227,467 B2 | 6/2007 | Feibelman | |
| 7,243,963 B2 * | 7/2007 | De Lima Castro | 292/315 |
| 7,347,068 B2 * | 3/2008 | Seidel | 70/57.1 |
| D566,598 S * | 4/2008 | Sayegh | D10/104.1 |
| D567,128 S * | 4/2008 | Sayegh | D10/104.1 |
| D578,030 S * | 10/2008 | Yang et al. | D10/106.94 |
| 7,456,741 B2 * | 11/2008 | Norman et al. | 340/568.1 |
| 7,518,521 B2 * | 4/2009 | Feibelman et al. | 340/572.9 |
| 7,626,501 B2 | 12/2009 | Feibelman | |
| 7,659,817 B2 * | 2/2010 | Conti et al. | 340/568.2 |
| 7,685,850 B2 * | 3/2010 | Nilsson | 70/18 |
| 7,808,390 B2 * | 10/2010 | Sayegh | 340/572.8 |
| 8,016,037 B2 * | 9/2011 | Bloom et al. | 166/255.1 |
| 8,281,626 B2 * | 10/2012 | Conti et al. | 70/57.1 |
| 2001/0028308 A1 * | 10/2001 | De La Huerga | 340/573.1 |
| 2002/0154014 A1 * | 10/2002 | Elston | 340/572.8 |
| 2002/0171550 A1 * | 11/2002 | Hirose et al. | 340/572.9 |
| 2004/0032332 A1 * | 2/2004 | Schiebler | 340/572.9 |
| 2005/0128089 A1 * | 6/2005 | Feibelman | 340/572.9 |
| 2005/0237205 A1 * | 10/2005 | Gorst | 340/572.9 |
| 2006/0144951 A1 * | 7/2006 | Schiebler | 235/487 |
| 2006/0145873 A1 * | 7/2006 | Feibelman et al. | 340/572.9 |
| 2006/0170549 A1 * | 8/2006 | Belden et al. | 340/568.2 |
| 2006/0202833 A1 * | 9/2006 | Norman et al. | 340/572.9 |
| 2007/0012772 A1 * | 1/2007 | Cooper | 235/435 |
| 2007/0120686 A1 * | 5/2007 | Spagna | 340/572.9 |
| 2007/0146144 A1 * | 6/2007 | Norman et al. | 340/572.8 |
| 2007/0234524 A1 * | 10/2007 | Witt | 24/16 PB |
| 2007/0273536 A1 * | 11/2007 | Marsilio et al. | 340/572.9 |
| 2008/0016711 A1 * | 1/2008 | Baebler | 33/559 |
| 2008/0165014 A1 * | 7/2008 | Sayegh | 340/572.9 |
| 2008/0316028 A1 * | 12/2008 | Conti et al. | 340/568.2 |
| 2009/0007470 A1 * | 1/2009 | Hill | 40/303 |
| 2009/0102666 A1 * | 4/2009 | Shute et al. | 340/572.9 |
| 2009/0223260 A1 * | 9/2009 | Conti et al. | 70/57.1 |
| 2009/0294521 A1 * | 12/2009 | De La Huerga | 235/375 |
| 2009/0303046 A1 * | 12/2009 | Eckert et al. | 340/568.4 |
| 2010/0089105 A1 * | 4/2010 | Fawcett et al. | 70/57.1 |
| 2010/0231388 A1 * | 9/2010 | Shute et al. | 340/568.4 |
| 2010/0271211 A1 * | 10/2010 | Arrighi | 340/572.8 |
| 2011/0057042 A1 * | 3/2011 | Duggan et al. | 235/492 |
| 2011/0095089 A1 * | 4/2011 | Kolton et al. | 235/492 |
| 2012/0019385 A1 * | 1/2012 | Brodzik et al. | 340/572.9 |
| 2012/0223838 A1 * | 9/2012 | Conti et al. | 340/572.1 |
| 2013/0008960 A1 * | 1/2013 | Bray | 235/385 |

* cited by examiner

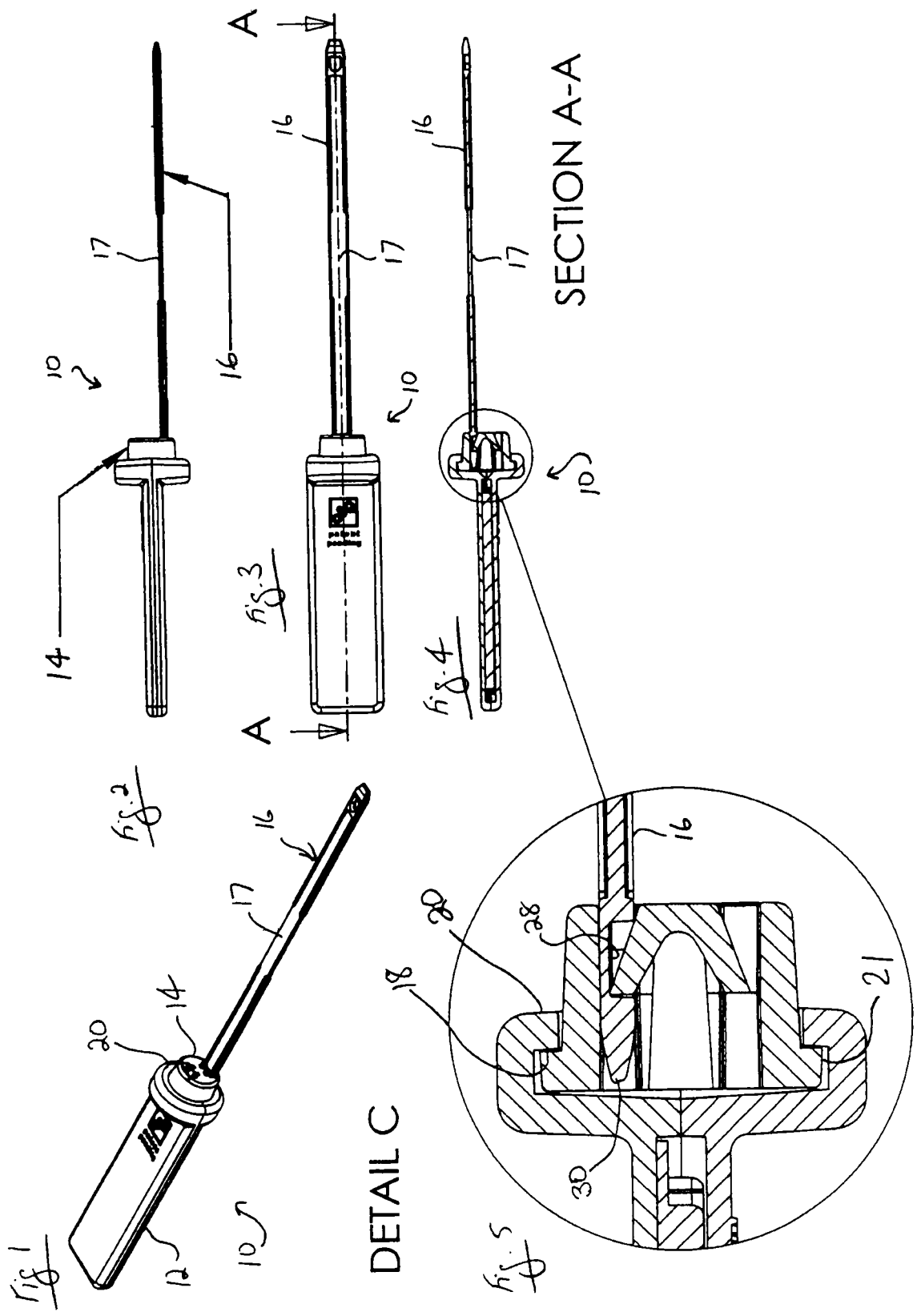

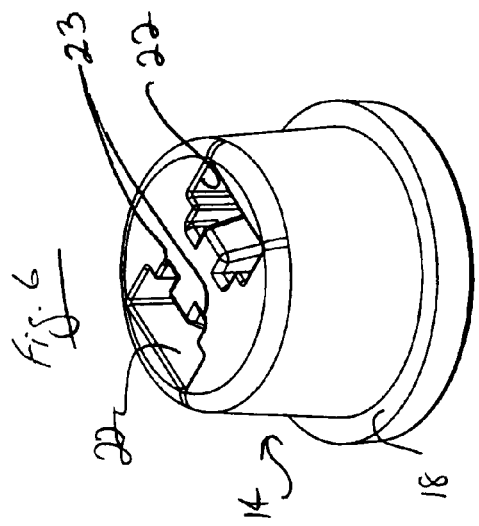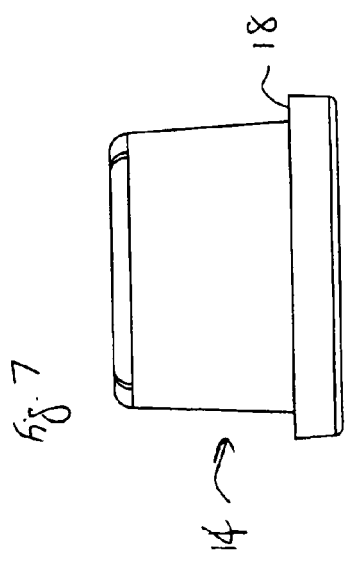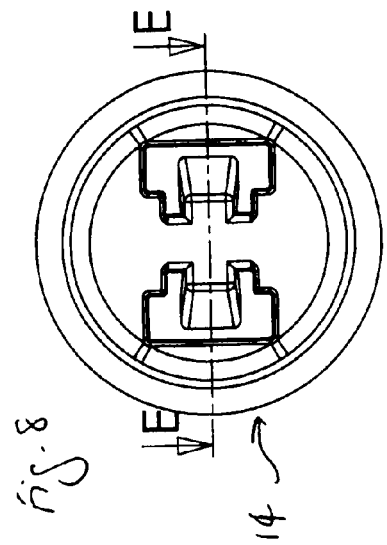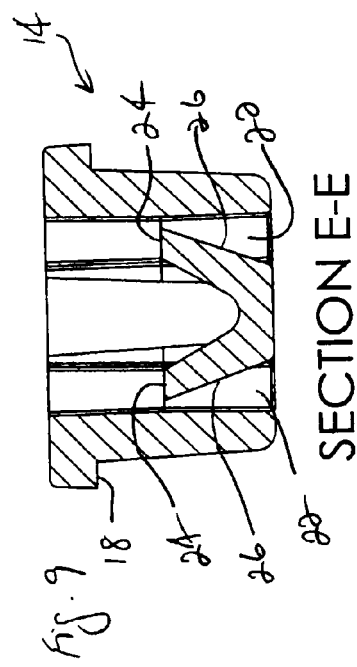

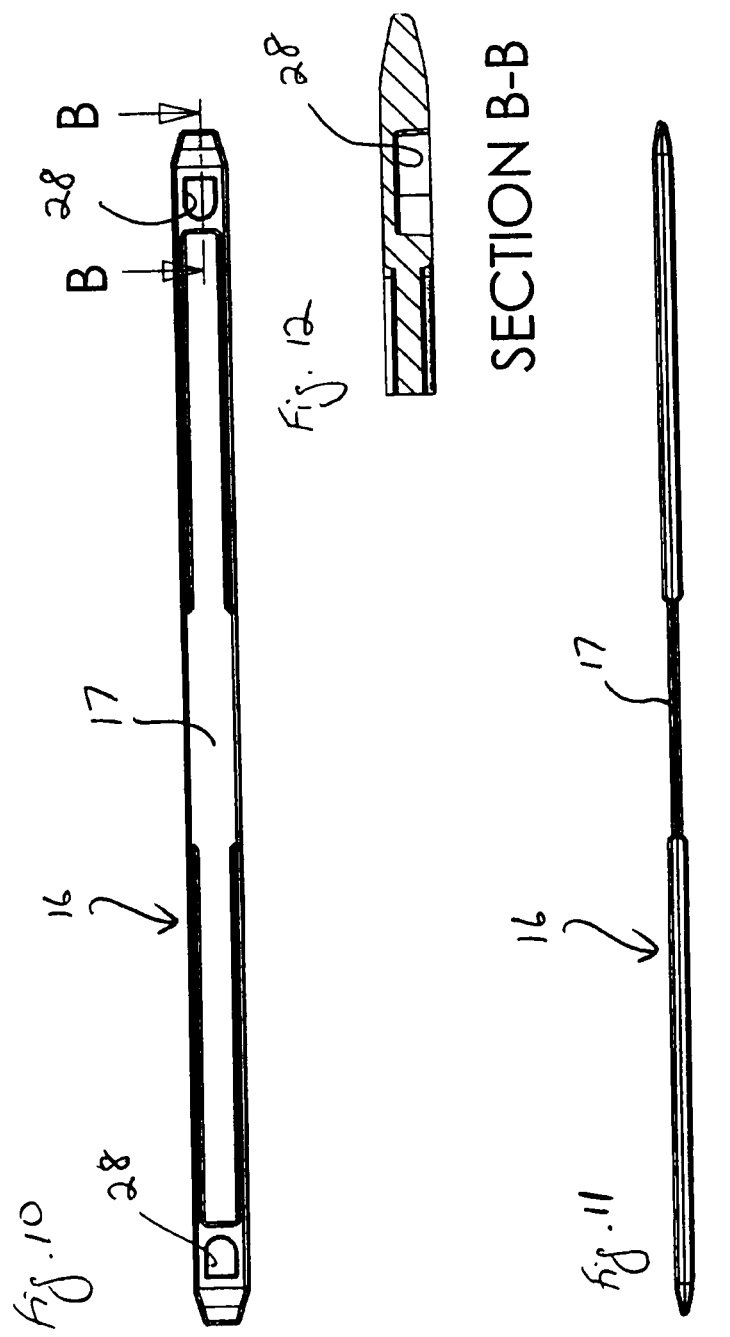

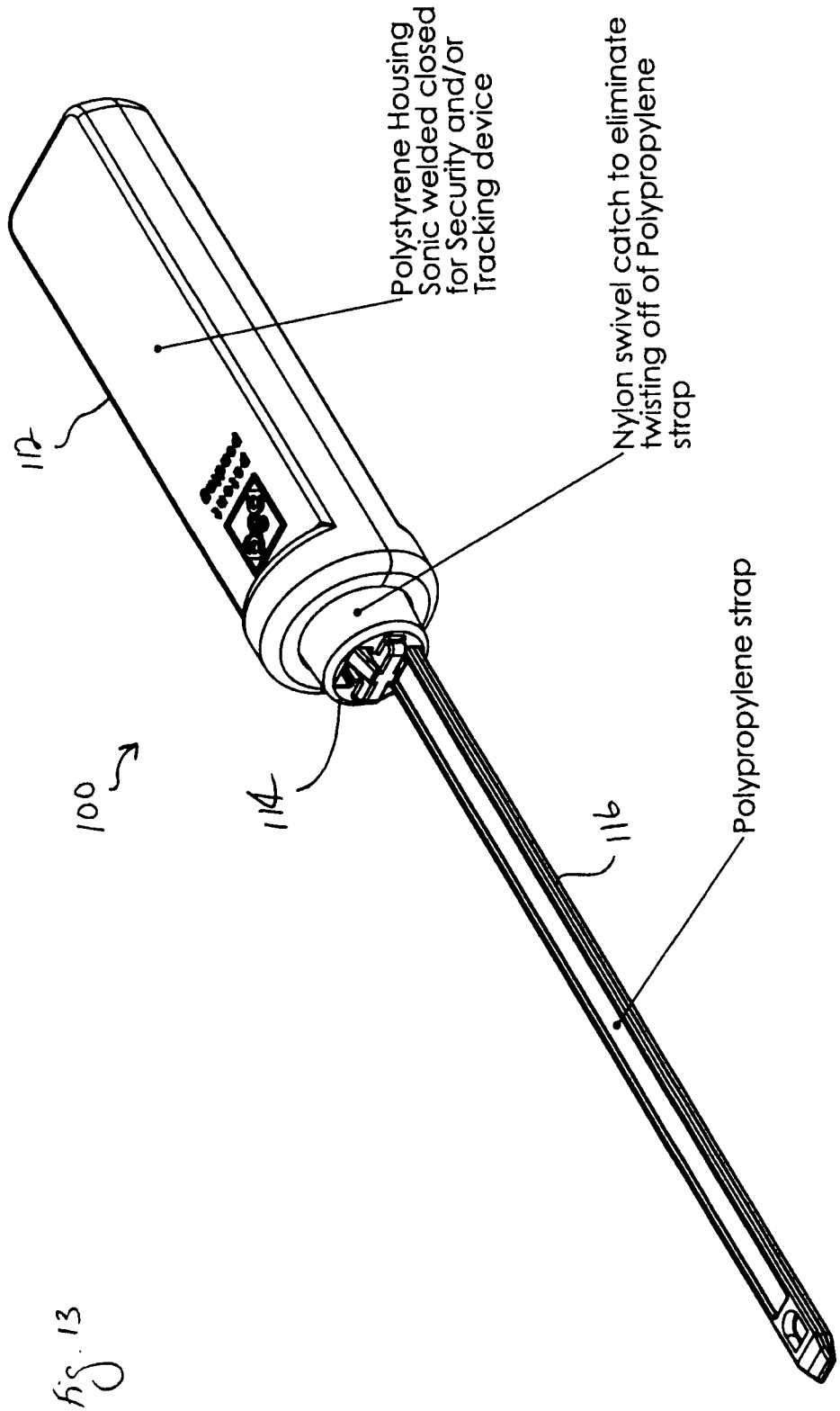

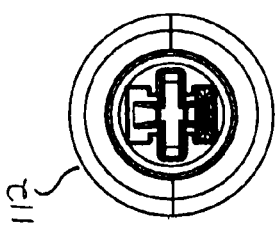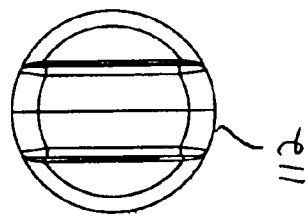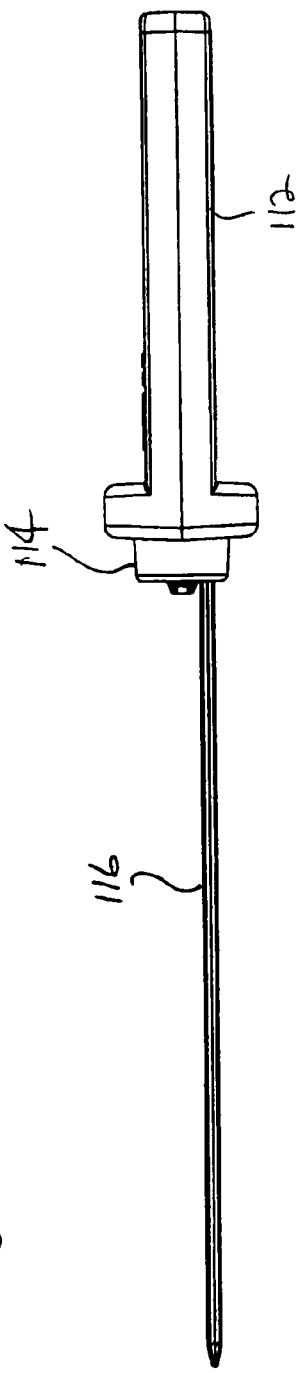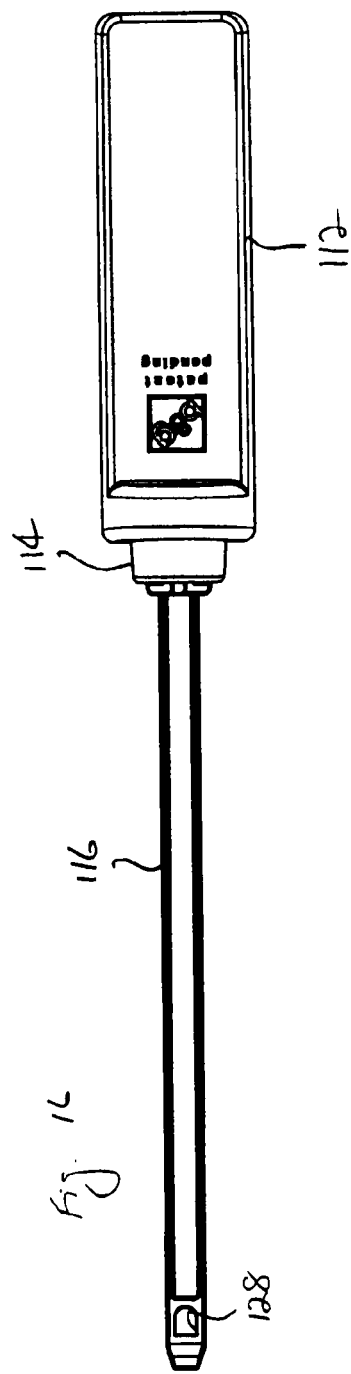

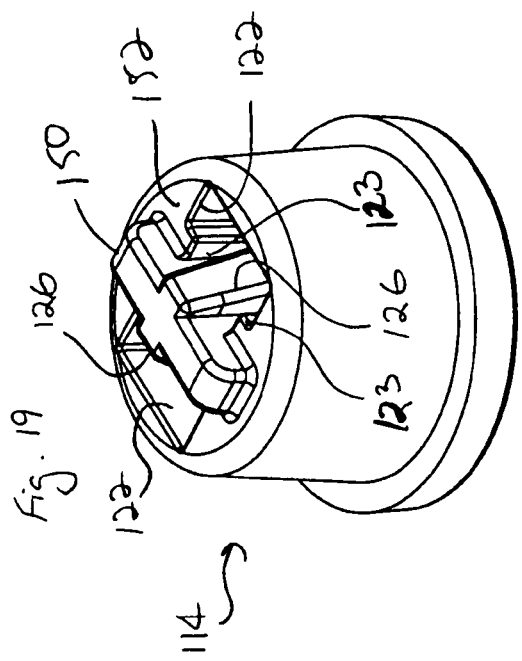
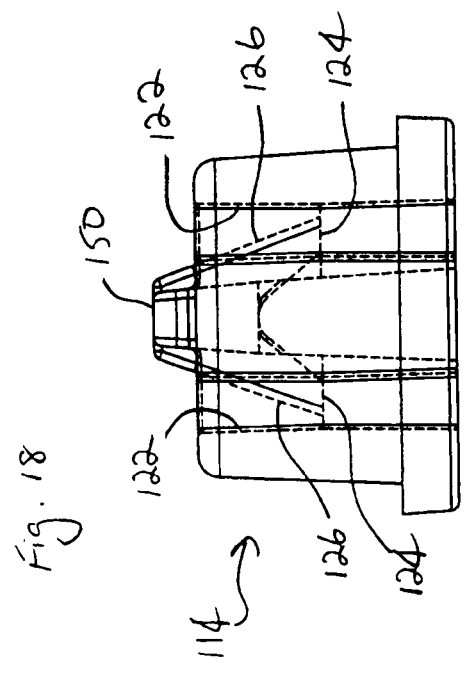
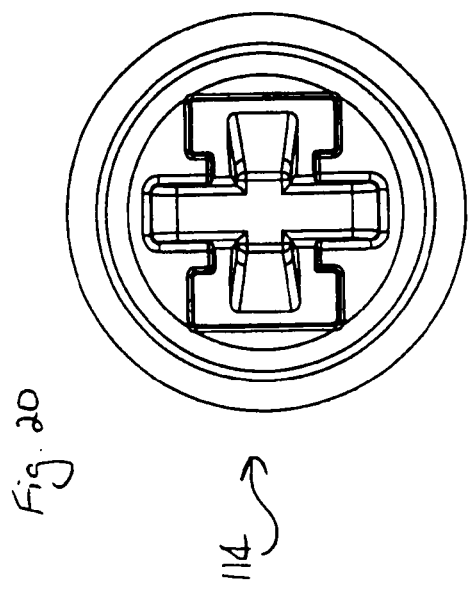

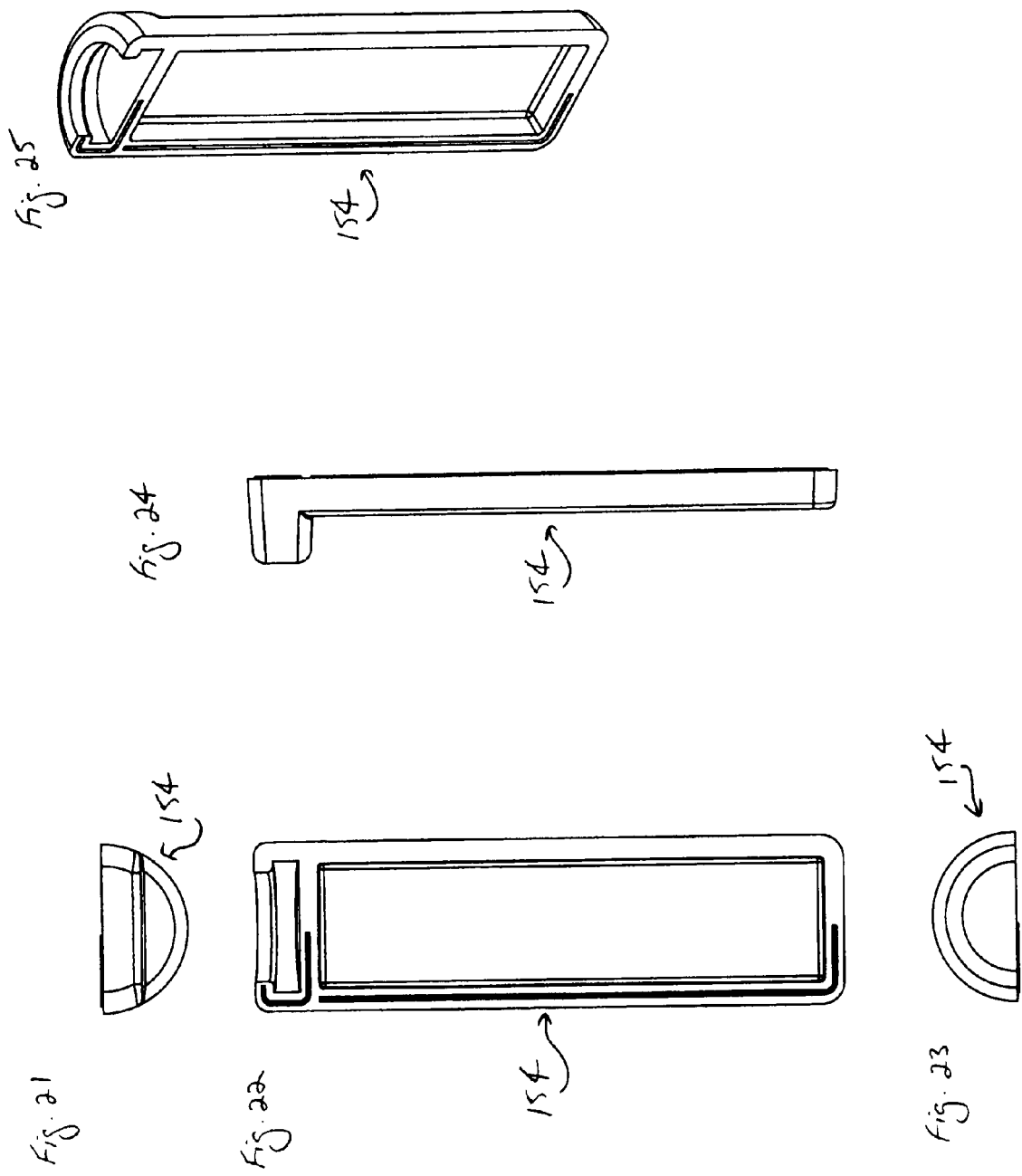

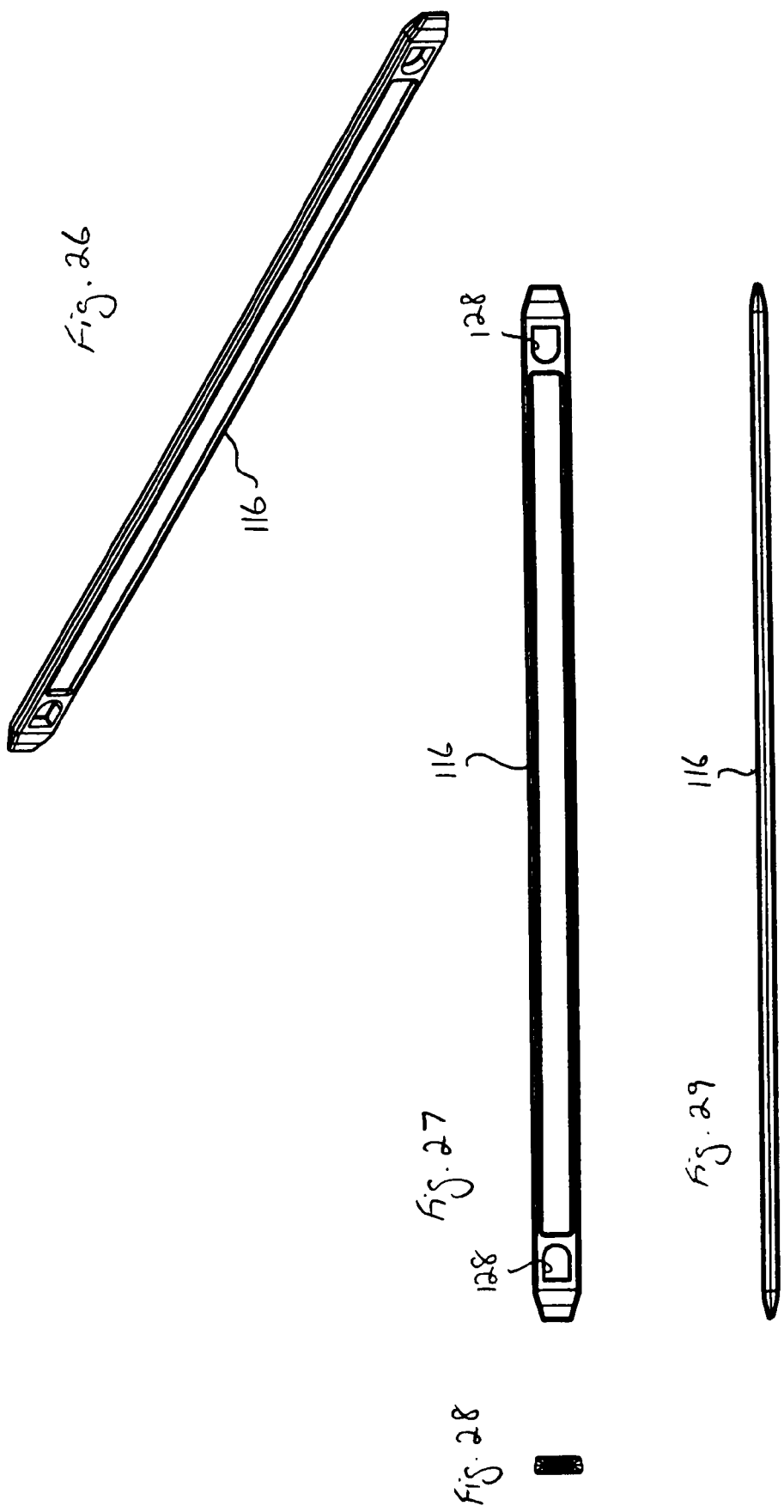

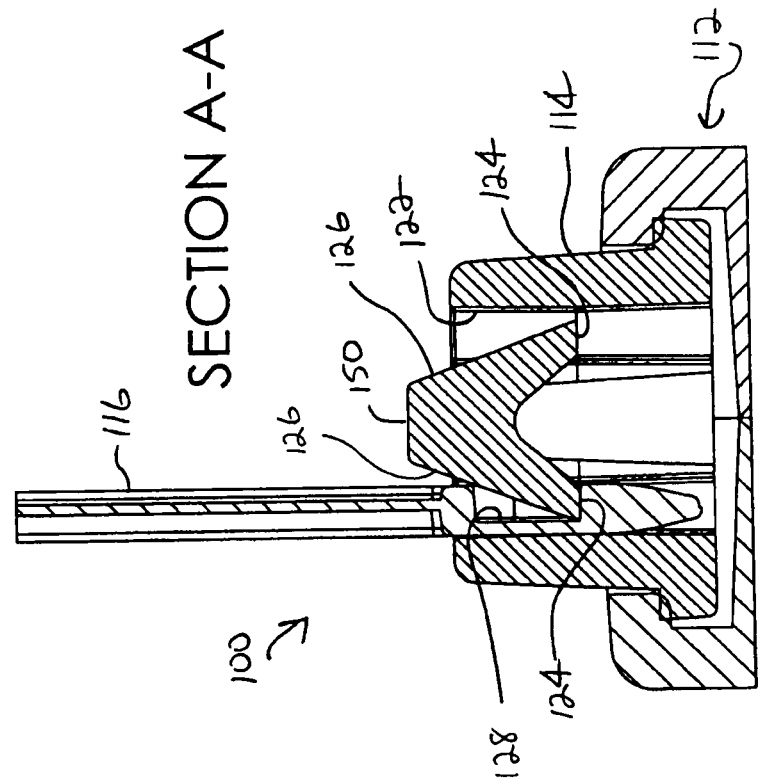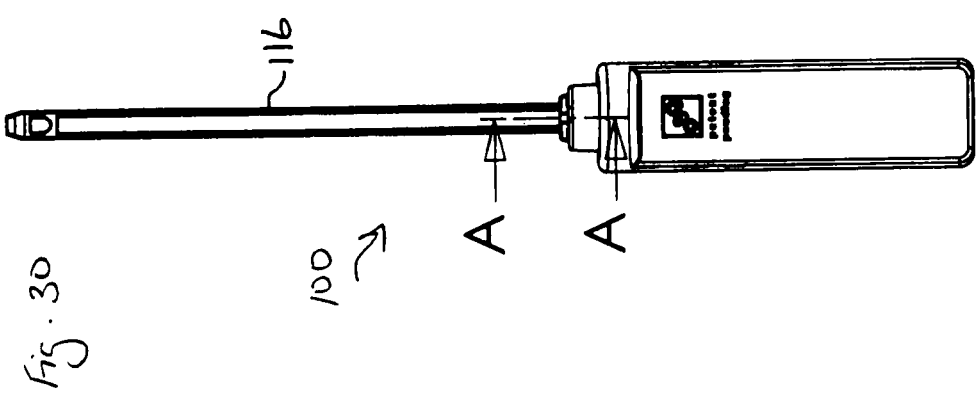

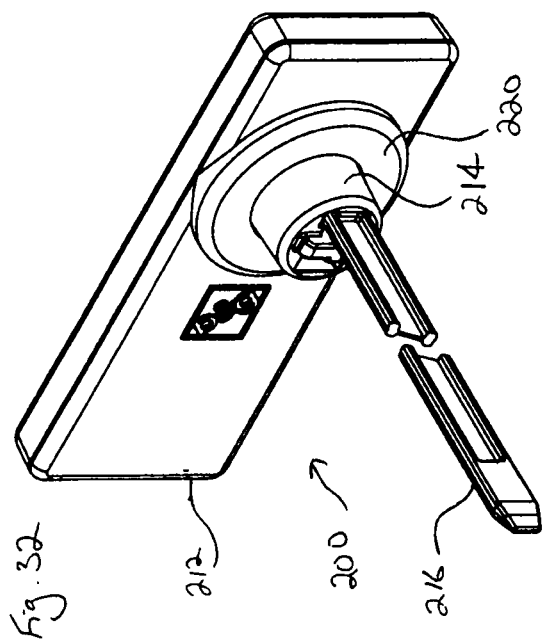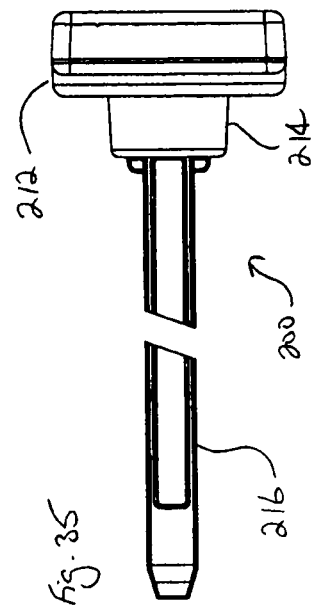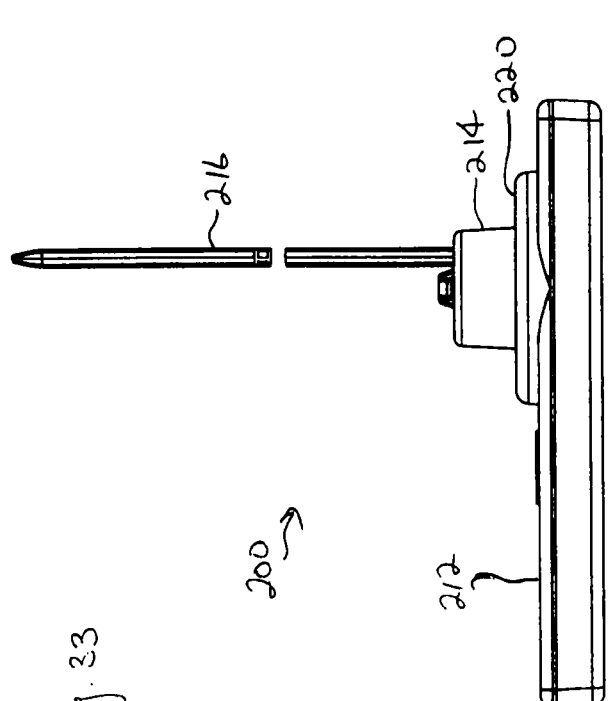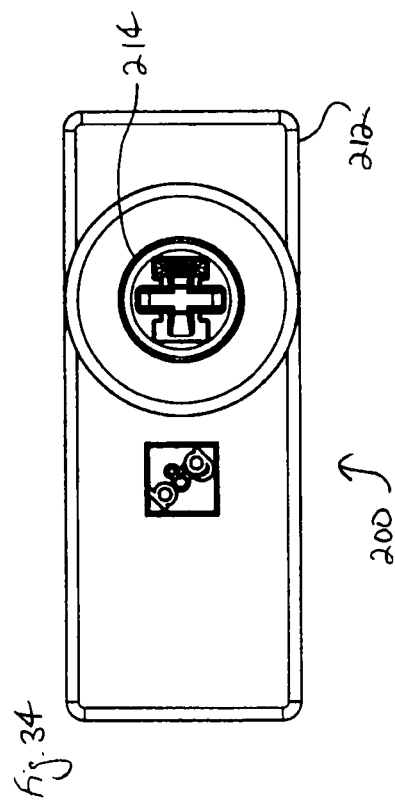

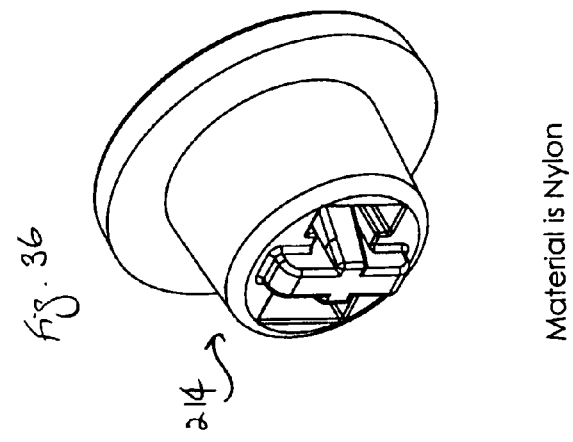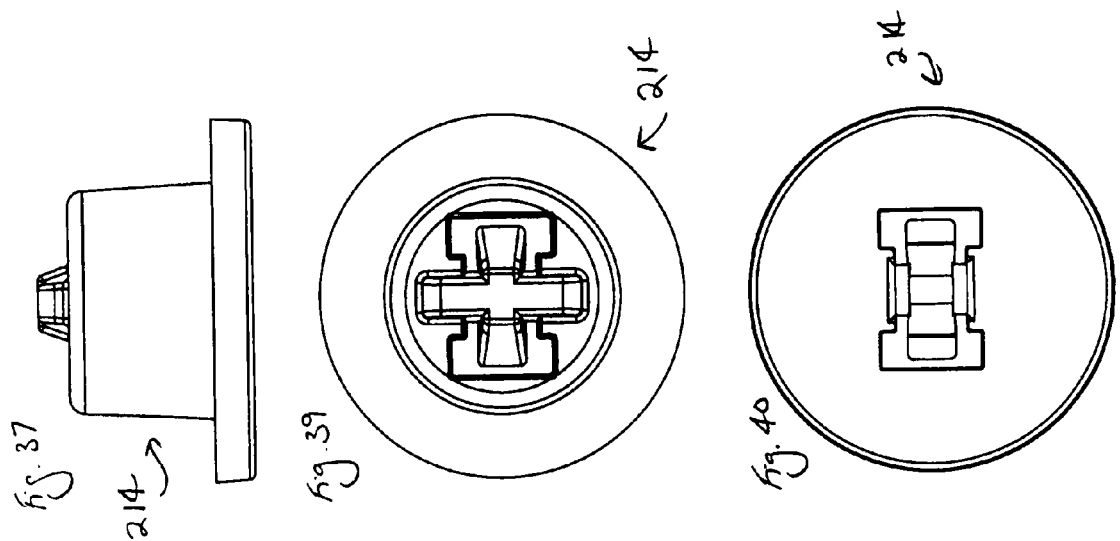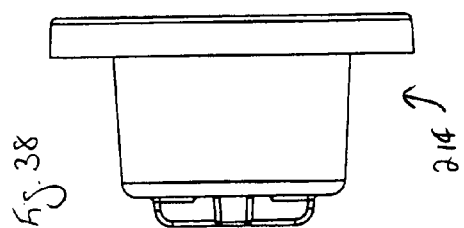

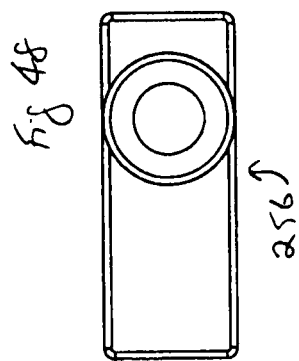
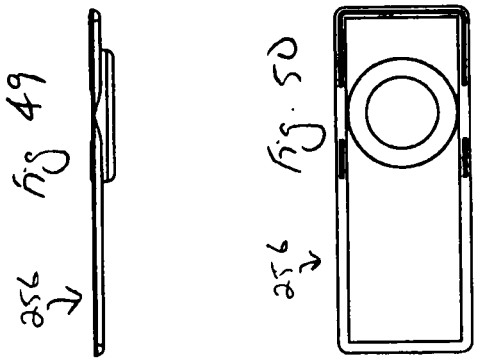
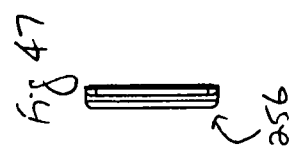
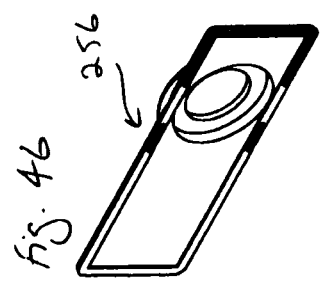
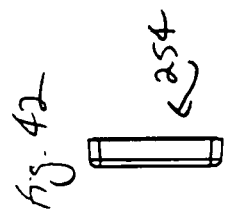
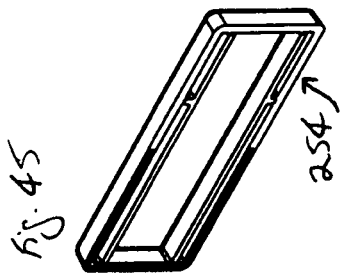
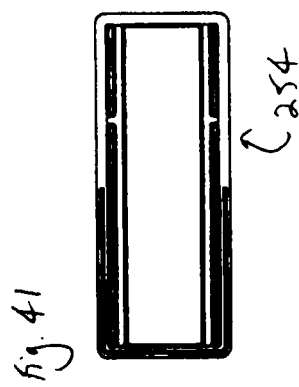
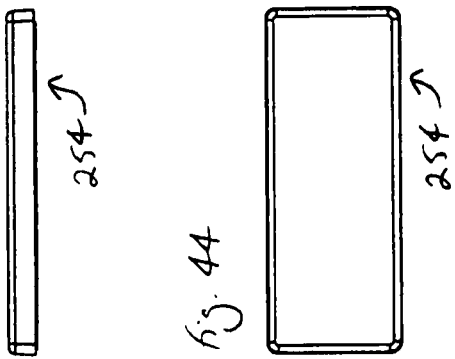
Material is Polypropylene

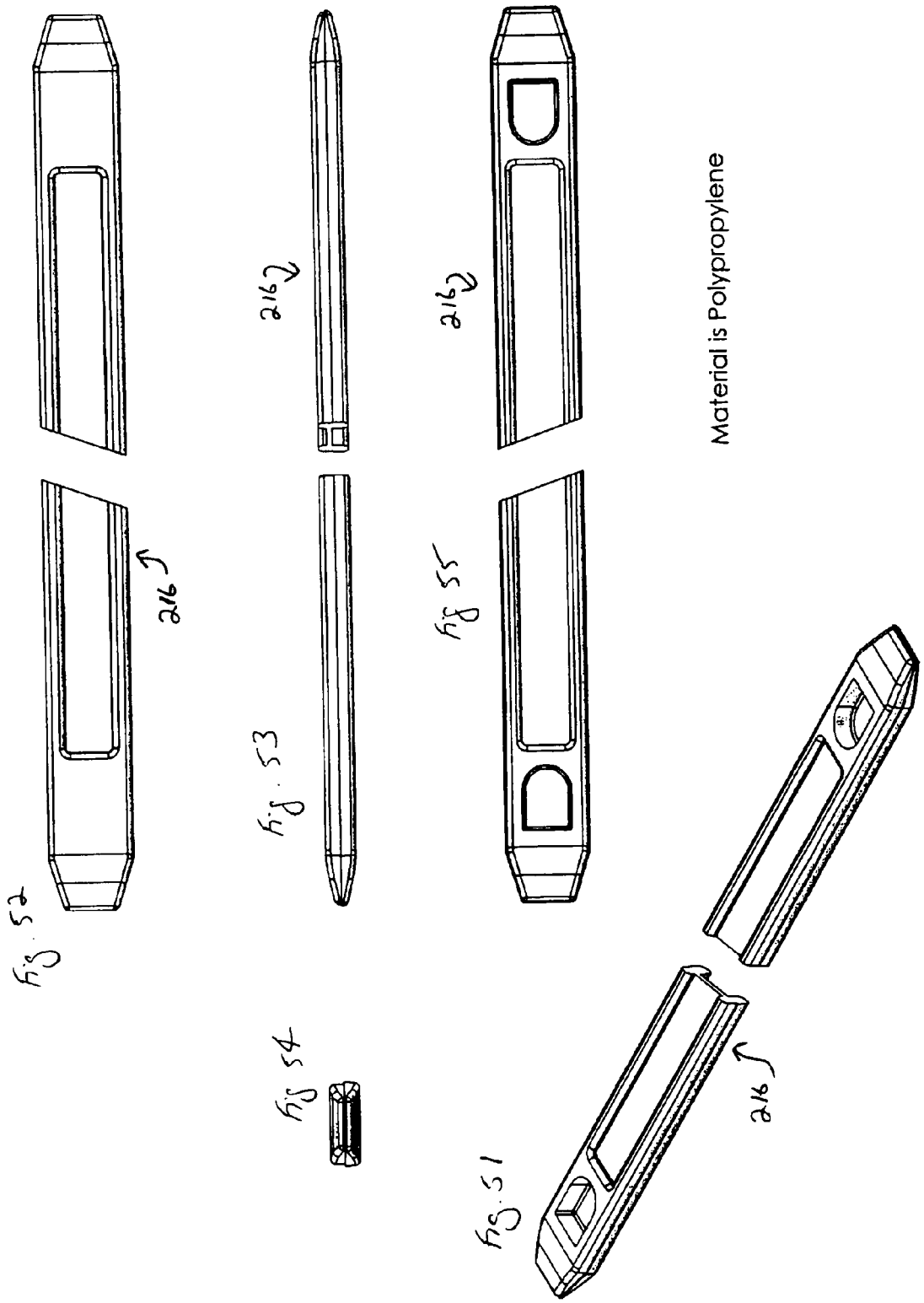

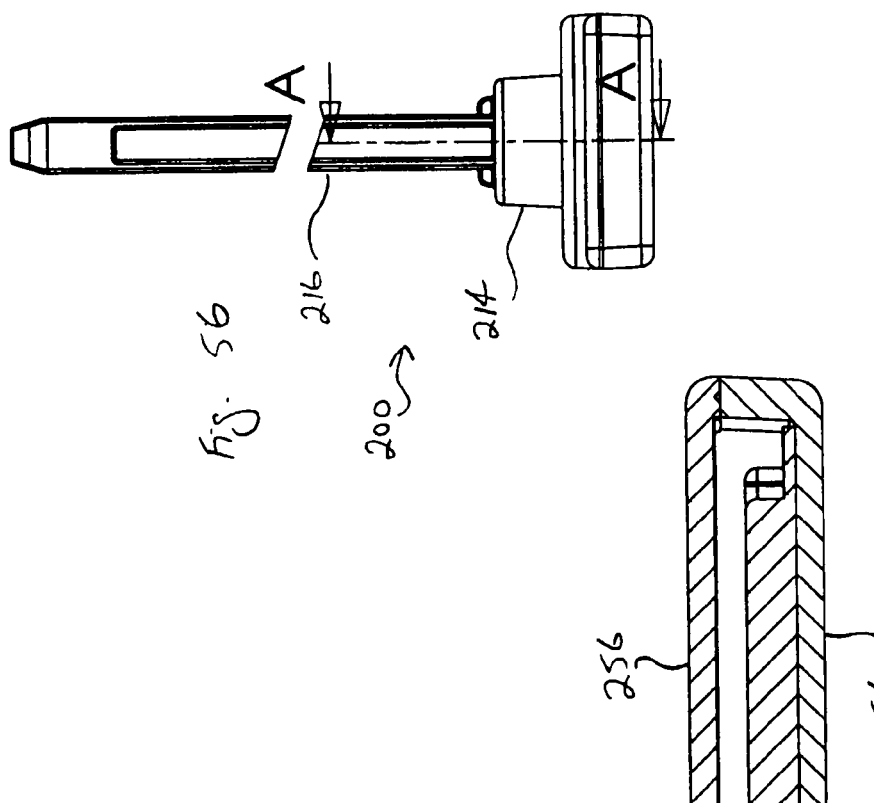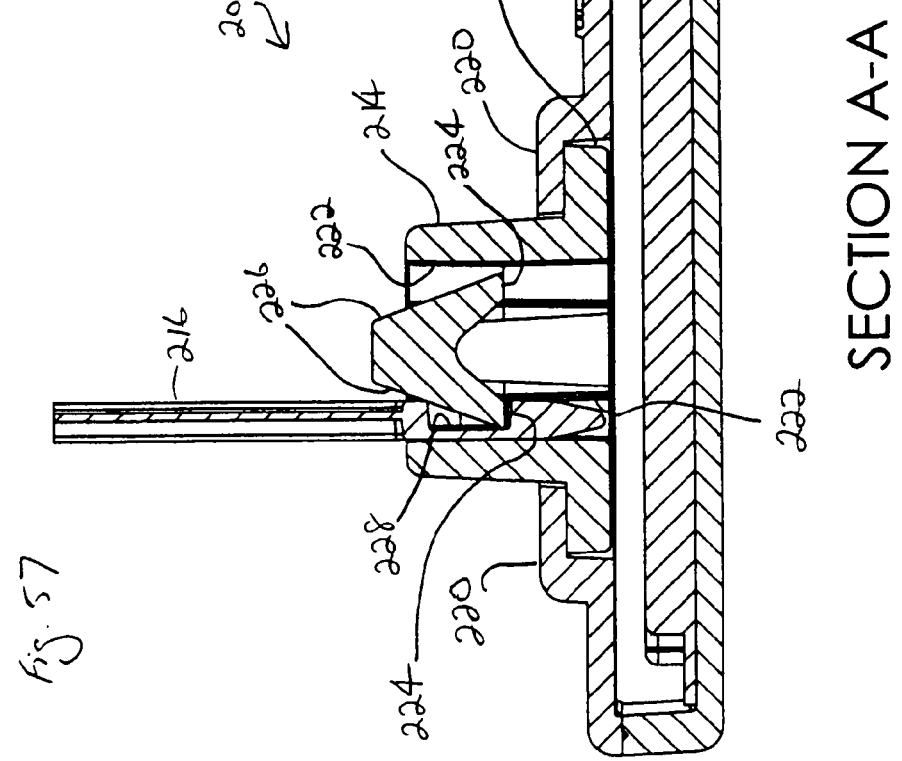

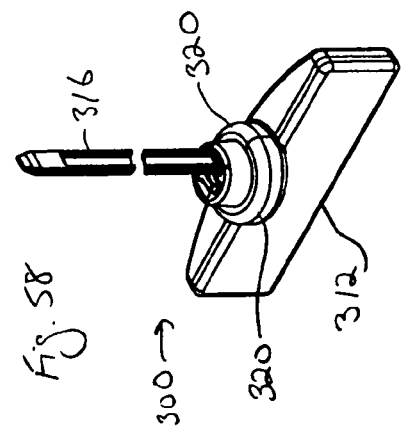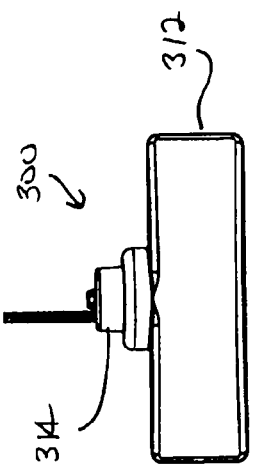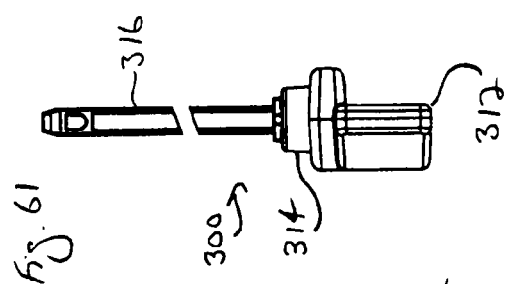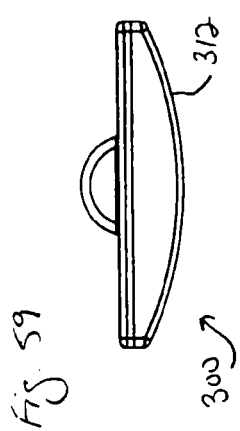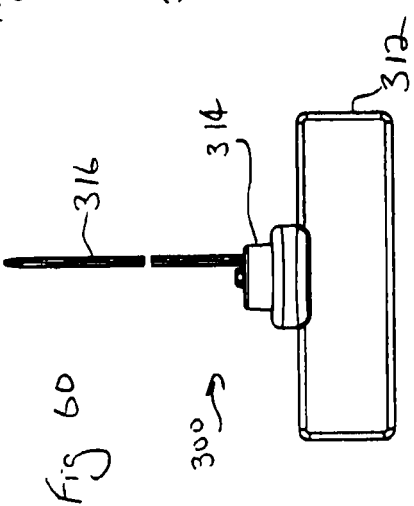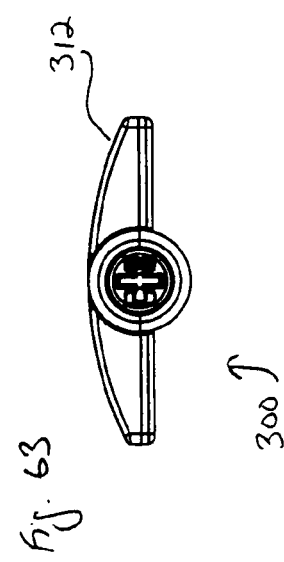

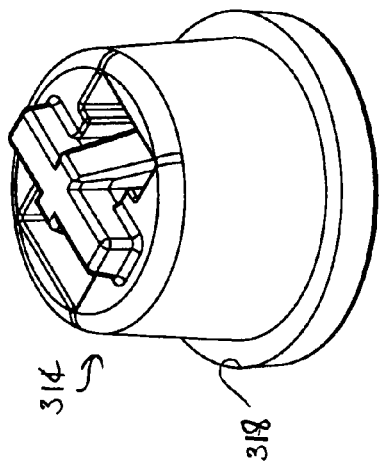
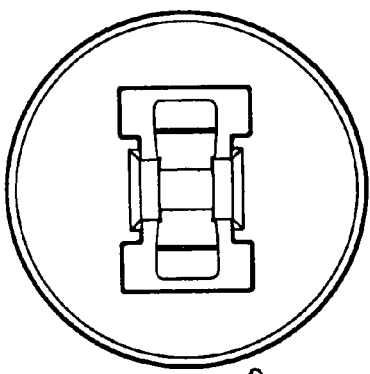
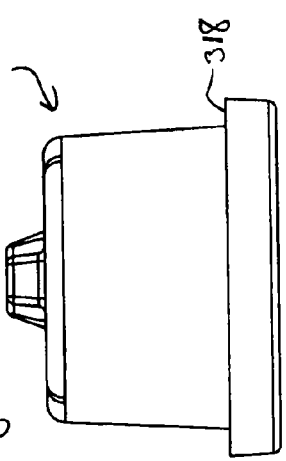
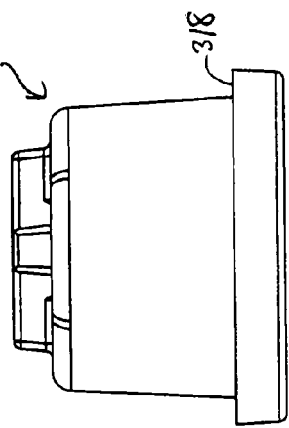
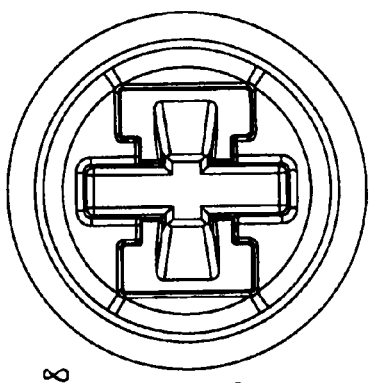

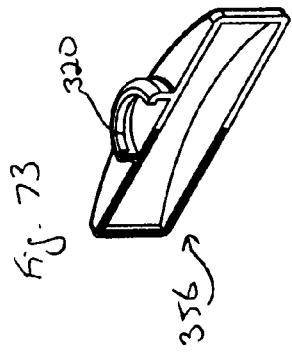
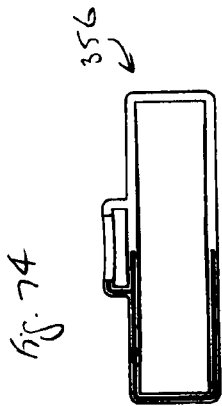
Material is Polystyrene
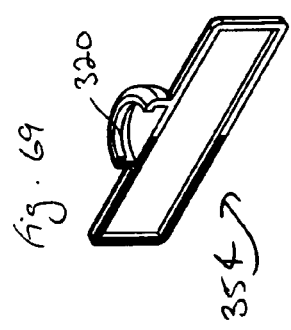
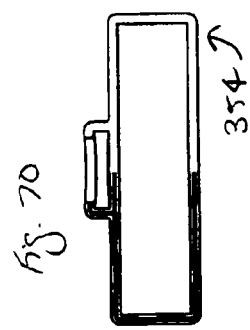
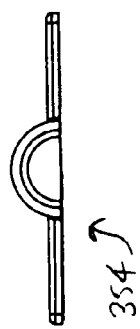
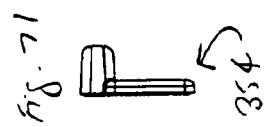

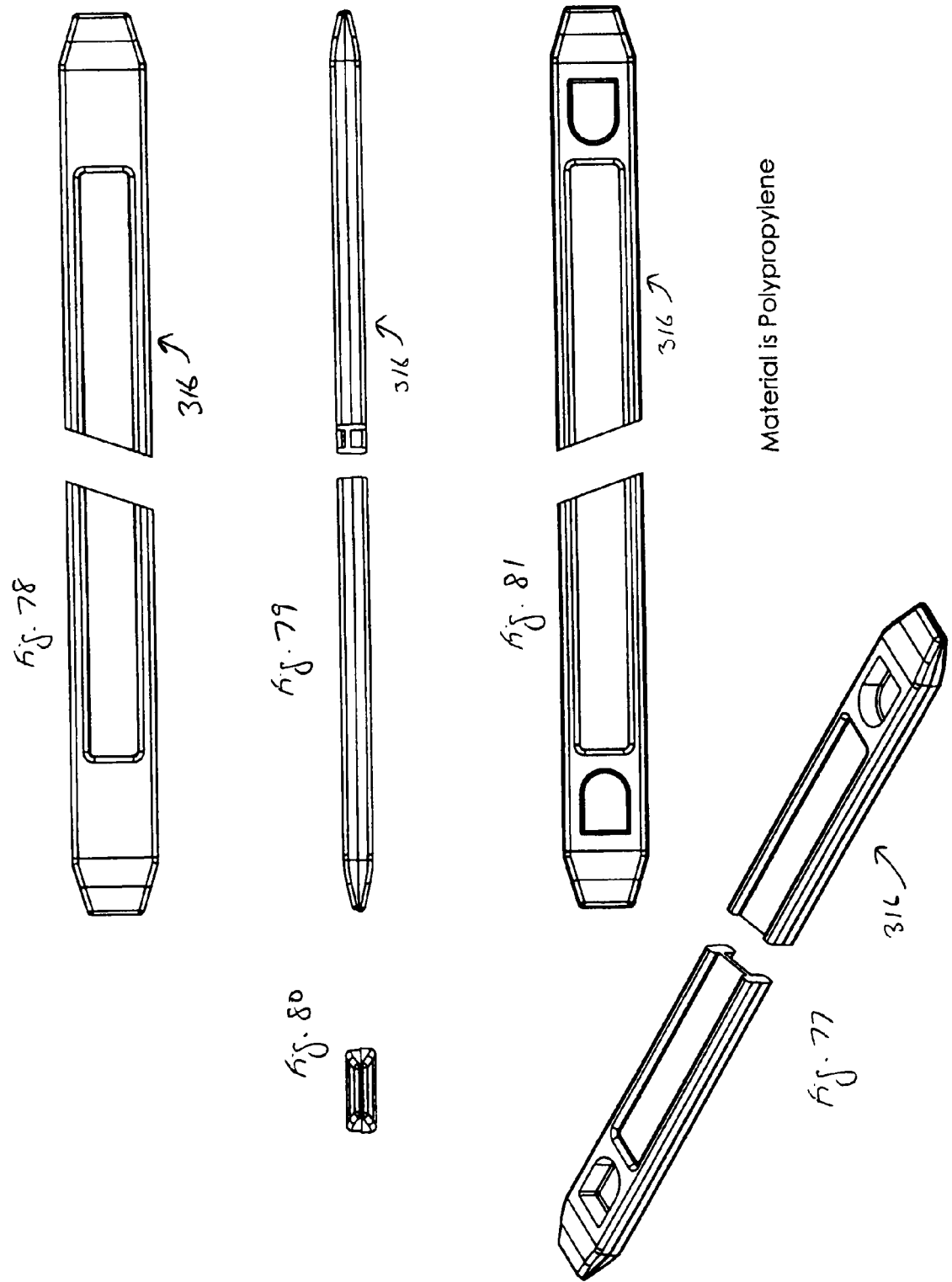

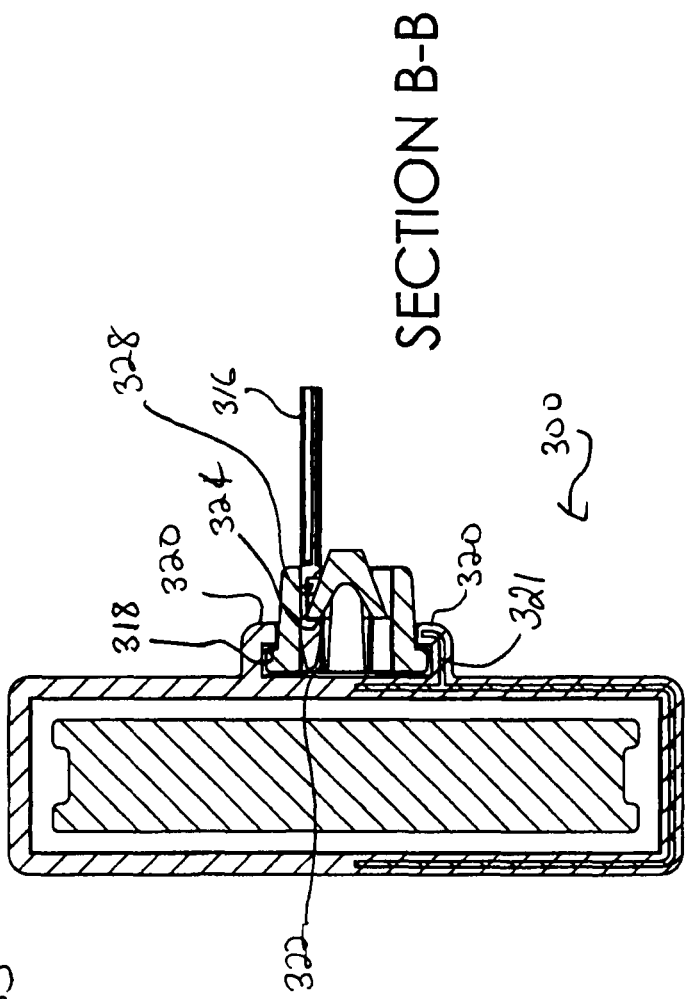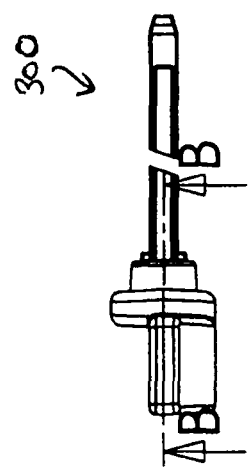

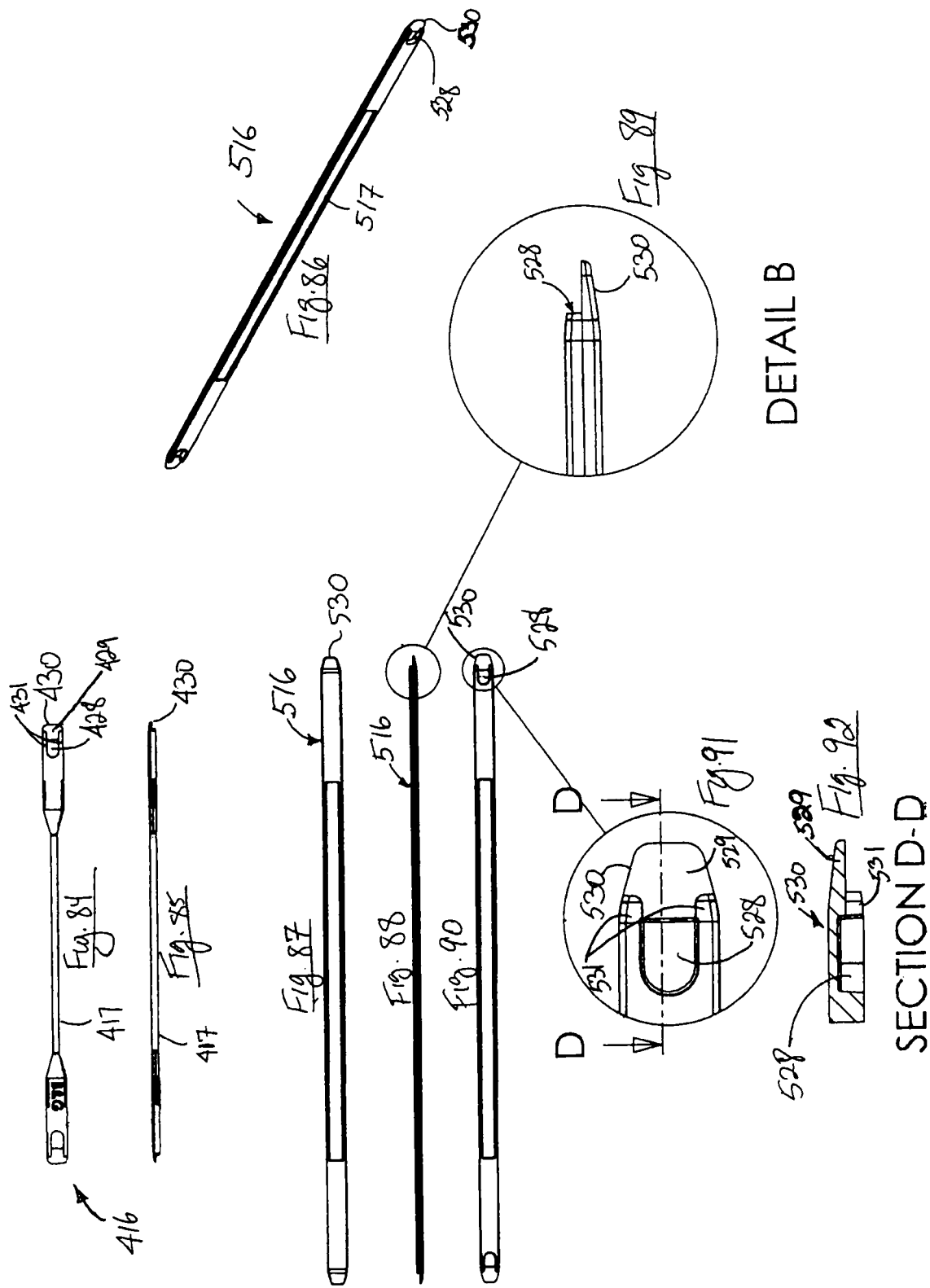

SECURITY HANG TAG WITH SWIVEL HEAD

CROSS-REFERENCE TO RELATED APPLICATIONS

This application claims the benefit of U.S. Provisional Application Ser. No. 61/088,561, entitled "Security Hang Tag with Swivel Head" and filed Aug. 13, 2008, which is incorporated herein by reference in its entirety.

BACKGROUND OF THE INVENTION

The present invention relates to a theft deterrent security tag for attachment to an article and, more particularly, to a security hang tag which allows for its rotation with respect to the article to be protected.

Electronic surveillance systems that use electronic article surveillance (EAS) markers to provide theft protection of articles to which the markers are attached are well known. EAS markers may be placed on or attached to various articles which are susceptible to theft. An associated detection apparatus is placed at the exit of a facility to detect the unauthorized transit of the article through the exit. Labels, tags, hangers and various other products may incorporate EAS markers to deter theft of the article.

With many of the EAS markers, by nature of the marker itself or by the article to which it attached, location of the EAS marker on the article is readily apparent to the prospective purchaser. Since the purchaser is aware of the presence of the EAS marker, the purchaser may attempt to remove the EAS marker in an unauthorized manner to defeat the electronic surveillance system.

One method of attaching an EAS marker to an article is through the use of a hang tag. Hang tags, such as the one shown in U.S. Pat. No. 6,624,753, provide a housing for supporting the EAS marker. A strap or cable tie is attached to the housing and the strap may be inserted into or around the article to be protected and permanently attached again to the housing. In the past, individuals have attempted to remove the hang tag by twisting the housing of the hang tag, thus rotating the hang tag with respect to the strap. This causes tension in the strap which, upon sufficient application, may cause the strap to sever thereby allowing the hang tag to be removed from the article. Thus, while it is desirable to use hang tags for various applications, prior art hang tags suffer from this disadvantage.

Certain prior art hang tags do provide a rotatable connection between the article to be protected and the housing of such hang tag. For example, U.S. Pat. No. 7,518,521 discloses a hang tag including a rotating inner core which cooperates with a wire element for attaching such hang tag to an article to be protected. However, it will be appreciated by those skilled in the art that applications exists in the marketplace which require a plastic strap, as compared to the wire or line of the mentioned publication. Moreover, the prior art design disclosed in the '521 patent can present both manufacturing and assembly issues, which increase the cost and complexity of such product.

Another hang tag having a rotatable head is disclosed in U.S. Pat. No. 7,183,914. Although the '914 patent discloses a hang tag employing a plastic strap, the design requires the strap to pass through a portion of the rotatable head, leaving a tail portion extending from such head after the hang tag is secured to the article. This exposed tail can be unsightly and/or undesirable in a retail setting. Moreover, the manufacture of the head/strap assembly of the '914 patent presents both manufacturing and cost challenges.

There is therefore a need in the art for a security hang tag which can both support an EAS marker and be secured to an article via a rotatable connection, thereby reducing the likelihood that the security hang tag can be removed from the article in an unauthorized manner. There is a further need in the art for this same security hang tag to include a plastic strap, and to be able to be manufactured in a cost efficient and efficient manner.

SUMMARY OF THE INVENTION

The present invention is directed to a security hang tag that can support an electronic surveillance marker and that can be secured to an article in a rotatable configuration to reduce the likelihood that the security hang tag can be removed from the article.

The security hang tag includes a body, a head and a strap. The body includes a head-receiving compartment defining a circumferentially-extending flange.

The head includes a circumferentially-extending lip to engage the flange, capturing the lip within the compartment such that the head is rotatably secured to the body. The head has a first strap-receiving channel including a first locking shoulder and a second strap-receiving channel including a second locking shoulder.

To facilitate insertion of the strap ends into the strap-receiving channels, the channels include ramped surfaces extending at least partially therein. To improve the pull-out strength of the head, the head can be provided with a nose portion that includes ramped surfaces extending at least partially into the channels.

The strap has first and second ends and includes a first cavity at the first end and a second cavity at the second end. The first end is configured for insertion within the first strap-receiving channel until the first cavity engages the first locking shoulder and the second end is configured for insertion within the second strap-receiving channel until the second cavity engages the second locking shoulder.

The ends of the strap can be formed with first and second reduced cross-sectional area tips that facilitate insertion of the ends into the strap-receiving channels. Specifically, the reduced cross-sectional area tips can taper away from the respective cavities. The reduced cross-sectional area tips can also include tongues that taper away from the cavities to further improve insertion.

The strap can also include a centrally-disposed region that has a reduced cross-sectional area to facilitate bending of the strap, allowing the strap to engage the article in a preferred manner or to provide a region for indicia or other viewable information.

For a more thorough understanding of the present invention, reference is made to the following description, taken in conjunction with the accompanying drawings, and its scope will be pointed out in the appended claims.

BRIEF DESCRIPTION OF THE DRAWINGS

FIGS. 1-12 are directed to a first embodiment of the present invention;

FIGS. 13-31 are directed to a second embodiment of the present invention;

FIGS. 32-57 are directed to a third embodiment of the present invention;

FIGS. 58-83 are directed to a fourth embodiment of the present invention;

FIGS. 84 and 85 are directed to an embodiment of a strap that can be employed with the first through the fourth embodiments of the present invention; and FIGS. 86-92 are directed to another embodiment of a strap that can be employed with the first through the fourth embodiments of the present invention.

DETAILED DESCRIPTION OF THE INVENTION

A security hang tag 10 is shown in FIG. 1. Security hang tag 10 includes a body 12, a rotatable head 14 and a strap 16. Body 12 is preferably formed as two separate pieces, or as a split-shell assembly, to allow an EAS marker to be disposed therein. Body 12 may be closed via a snap-fit connection, glue, welding, or other such means. Strap 16 may include a centrally-disposed region 17 having a reduced cross-sectional thickness. The centrally-disposed region 17 may be included in the strap to facilitate bending of the strap, to allow the strap to engage an item in a preferred manner or to provide a region for indicia or other viewable information. Strap 16 is preferably formed of plastic.

Head 14 is secured to body 12 in a rotatable manner. More particularly, head 14 is preferably provided with a lip 18 which engages a circumferentially-extending flange 20 (as best seen in FIG. 5) located on an outwardly-opening head-receiving compartment 21 defined by body 12. Lip 18 of head 14 is preferably positioned within compartment 21 of body 12 prior to the closure of such body. Once body 12 is closed to capture the EAS marker therein, lip 18 is also captured or disposed within compartment 21 of body 12. It will be appreciated by those skilled in the art that such an arrangement allows the substantial majority of head 14 to extend beyond flange 20, while allowing head 14 to rotate with respect to body 12. It will be further appreciated that the disclosed configuration allows the substantial majority of body 12 to be formed with a slim profile, while also providing an assembly having a reduced number of components and which can be more readily/cost effectively manufactured.

Referring to FIGS. 6-9, head 14 is preferably insert molded as a single piece. In this regard, head 14 is provided with a pair of opposing strap-receiving channels 22 configured to receive the ends of the strap 16. Each channel 22 preferably includes a locking shoulder 24, a ramped surface 26 and a pair of guide channels 23, while each end of strap 16 includes a cavity 28. As best seen in FIG. 5, a first end of the strap 16 is inserted into a first channel 22 until shoulder 24 engages cavity 28 of the first end. The reduced cross-sectional area of tip 30, together with ramping surface 26 and guide channels 23, facilitate insertion of the strap into channel 22, and subsequent engagement of shoulder 24 with cavity 28. Following the engagement of strap 16 with the article to be secured, a second end of the strap is inserted into the second channel 22 of head 14, engaging shoulder 24 with cavity 28 of the second end. At this point, the strap is engaged with head 14 in a non-removable manner. However, head 14 is free to rotate with respect to body 12, thereby reducing/eliminating the possibility that the security hang tag can be "twisted-off" the article in an unauthorized manner.

Accordingly, the present security hang tag provides a simplified design which facilitates the manufacture of its components, as well as the subsequent assembly of such components. This, of course, provides a security hang tag which can be produced at reduced cost. Moreover, the present security hang tag provides a design in which a plastic strap can be used as the securing member. In certain applications, the end user may desire straps having various color codes or other identifying indicia thereon. In addition, the design of the present security hang tag allows the end user to utilize the same body with straps of varying lengths. More particularly, the end user can be provided with an assortment of straps of various lengths whereby the end user can select a strap with an appropriate length for the particular application.

Another embodiment of the present invention, i.e., security hang tag 100, is shown in FIGS. 13-31. Security hang tag 100 includes a body 112, a rotatable head 114 and a strap 116. Security hang tag 100 is similar in construction to security hang tag 10, but includes some differences in the design of strap 116 and the design of head 114. With respect to strap 116, such strap may be formed with a continuous cross-sectional thickness, as compared to strap 16. With respect to head 114, such head includes a nose portion 150, which protrudes outward from surface 152. Strap-receiving channels 122 are positioned on the sides of nose portion 150, with each channel 122 including a pair of guide channels 123. Head 114 further includes a pair of ramping surfaces 126 and a pair of locking shoulders 124. As best seen in FIG. 31, locking shoulder 124 engages cavity 128 when strap 116 is inserted within channel 122. The nose portion 150 improves the pull-out strength of the head 114 with respect to the strap 116 because the locking shoulder 124 can have a larger cross-sectional area to restrain the strap 116 therein. FIGS. 21-25 show details of shell 154, which forms one-half of body 112.

The configuration of head 114, and particularly the inclusion of nose 150 which allows ramps 126 to extend beyond the surface 152 of the head 114, facilitates insertion of the end of the strap 116 into the receiving channel 122. It will be appreciated that such a construction also facilitates the manufacture of such components.

Another embodiment of the present invention is shown in FIGS. 33-57. More particularly, a face-mounted swivel security hang tag 200 is shown in such figures. Security hang tag 200 includes a body 212, a rotatable head 214 and a strap 216. Head 214 and strap 216 are similar in design and construction to head 114 and strap 116 described hereinabove with respect to the second embodiment of the present invention. However, the orientation of head 214 and strap 216 with respect to body 212 is different from that described with respect to security hang tag 100, as well as security hang tag 10 of the first embodiment. More particularly, body 212 is formed with a substantially rectangular configuration having an opening on the face of one side defined by a circumferentially-extending flange 220 (best seen in FIG. 57) located on an outwardly-opening head-receiving compartment 221. Those skilled in the art will appreciate that it may be desirable in various retail applications to utilize a swivel security tag wherein the strap protrudes from the front face of the swivel security tag.

FIGS. 36-40 show details of the rotatable head 214, while FIGS. 41-50 show details of the bottom shell 154 and the top shell 156, which together form body 212. As best shown in FIG. 57, strap 216 is inserted within channel 222 until shoulder 224 engages slot 228. As discussed hereinabove, ramp surfaces 226 facilitate the insertion of strap 216 into channel 222.

Still another embodiment of the present invention, a horizontal security hang tag 300, is shown in FIGS. 59-83. Security hang tag 300 includes a body 312, a rotatable head 314 and a strap 316. The construction of head 314 and strap 316 is similar to head 114 and strap 116 described hereinabove with respect to the second embodiment of the present invention. FIGS. 65-68 show details of head 314, while FIGS. 69-76 shown details of the individual shell, i.e., shell 354 and shell 356, which together form housing 312. FIGS. 77-81 show details of strap 316.

Together, shells 354 and 356 define a circumferentially-extending flange 320 located on an outwardly-opening head-receiving compartment 321 of the head 314 which captures lip 318. As best seen in FIG. 83, one end of strap 316 is received within a strap receiving channel 322 until shoulder 324 engages slot 328 of strap 316. Those skilled in the art will appreciate that different retail applications may require the security hang tag to have a particular body configuration, such as the configuration shown in FIGS. 58-83.

FIGS. 84 and 85 show a strap embodiment 416 that can be employed in any of the hang tag embodiments described hereinabove. Strap 416 includes a centrally-disposed region 417 having a reduced cross-sectional area (i.e., square or round cross-section), a pair of cavities 428 and a pair of reduced cross-sectional area tips 430. The centrally-disposed region 417 may be included in the strap 416 to allow the strap to more easily engage certain articles or items. The reduced cross-sectional area tip 430 includes a tongue 429 that tapers in a direction away from cavity 428 and a pair of opposing rails 431 that extend along at least a portion of the tongue 429 and which help to better direct the strap 416 along the ramped surfaces of the head until cavity 428 engages the locking shoulders located in the head.

FIGS. 87-92 show a strap embodiment 516 that can also be employed in any of the hang tag embodiments described hereinabove. Strap 516 includes a centrally-disposed region 517 having a reduced cross-sectional area, a pair of cavities 528 and a pair of reduced cross-sectional area tips 530. The reduced cross-sectional area tip 530 includes a tongue 529 that tapers in a direction away from cavity 528 and a pair of opposing rails 531 that extend along at least a portion of the tongue 529 and which help to better direct the strap 516 along the ramped surfaces of the head until cavity 528 engages the locking shoulders located in the head.

It will be evident that various modifications and changes may be made to the specific embodiments described herein without departing from the broader scope of the these embodiments. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments shown are described in sufficient detail to enable those skilled in the art to practice the teachings disclosed herein. Other embodiments may be utilized and derived therefrom, such that structural substitutions and changes may be made without departing from the scope of embodiments. This Detailed Description, therefore, is not to be taken in a limiting sense, and the scope of various embodiments is defined only by the appended claims, along with the full range of equivalents to which such claims are entitled.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein will be apparent to those of skill in the art upon reviewing the above description.

In the foregoing description, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

The invention claimed is:

1. A security hang tag, comprising:
   a body sized to receive an electronic surveillance marker, said body including a head-receiving compartment, said compartment defining a circumferentially-extending flange;
   a head including a first end and a second end, wherein a circumferentially-extending lip defines said first end, said lip being sized to engage said flange thereby capturing said lip within said compartment such that said head is rotatably secured to said body, at least a portion of the second end of said head extending beyond said flange and outside of said compartment, said head having a first strap-receiving channel including a first ramped surface disposed between a first pair of guide channels, wherein the first ramped surface extends from a top surface of said second end and terminates at a first locking shoulder and a second strap-receiving channel including a second ramped surface disposed between a second pair of guide channels, wherein the second ramped surface extends from the top surface of said second end and terminates at a second locking shoulder, and wherein said first ramped surface and said second ramped surface extend into said first and said second strap-receiving channels and away from each other; and
   a strap having first and second ends and being configured to engage an item to be protected, said strap including a first cavity at said first end and a second cavity at said second end, said first end configured for insertion within said first strap-receiving channel until said first cavity engages said first locking shoulder to lock the first end of the strap in the head and prevent further insertion or withdrawal and said second end configured for insertion within said second strap-receiving channel until said second cavity engages said second locking shoulder to lock the second end of the strap in the head and prevent further insertion and retraction.

2. The security hang tag of claim 1, wherein the head is molded as a single component part.

3. The security hang tag of claim 1, wherein more than one-half of the head extends outwardly from the body.

4. The security hang tag of claim 1, wherein said first and second ends of said strap are formed with first and second reduced cross-sectional area tips configured to facilitate insertion of said ends into said strap-receiving channels.

5. The security hang tag of claim 4, wherein said first reduced cross-sectional area tip tapers away from the first cavity and said second reduced cross-sectional area tip tapers away from the second cavity.

6. The security hang tag of claim 4, wherein said first reduced cross-sectional area tip includes a first tongue that tapers away from the first cavity and said second reduced cross-sectional area tip includes a second tongue that tapers away from the second cavity.

7. The security hang tag of claim 4, wherein the reduced cross-sectional area is one of square and round.

8. The security hang tag of claim 1, wherein said strap includes a centrally-disposed region having a reduced cross-section.

9. The security hang tag of claim 1, wherein said strap includes a pair of opposing tapered cross-section regions.

10. The security hang tag of claim 9, wherein the strap further includes a centrally-disposed region having a reduced cross-sectional area.

11. The security hang tag of claim 1, further comprising said electronic article surveillance maker disposed in said body.

12. A security hang tag comprising:
a body sized to receive an electronic surveillance marker, said body including a head-receiving compartment, said compartment defining a circumferentially-extending flange;
a head including a first end, a second end, first and second strap-receiving channels extending between said first and second ends, wherein a circumferentially-extending lip is defined by said first end, said lip being sized to engage said flange thereby capturing said lip within said compartment such that said head is rotatably secured to said body, at least a portion of said head extending beyond said flange and outside of said compartment, said first strap-receiving channel including a first locking shoulder and said second strap-receiving channel including a second locking shoulder, the second end of the head including a nose portion that includes a first ramped surface extending into the first strap-receiving channel and a second ramped surface extending into the second strap-receiving channel, and wherein each of said ramped surfaces terminates at the locking shoulder; and
a strap having first end and second end and being configured to engage an item to be protected, said strap including a first cavity at said first end and a second cavity at said second end, said first end configured for insertion within said first strap-receiving channel guided by the first ramped surface until said first cavity engages said first locking shoulder to lock the first end of the strap in the head and prevent further insertion or withdrawal and said second end configured for insertion within said second strap-receiving channel guided by the second ramped surface until said second cavity engages said second locking shoulder to lock the second end of the strap in the head and prevent further insertion or withdrawal.

13. The security hang tag of claim 12, wherein said first and second ends of said strap are formed with first and second reduced cross-sectional area tips configured to facilitate insertion said ends into said strap-receiving channels.

14. The security hang tag of claim 13, wherein said first reduced cross-sectional area tip tapers away from the first cavity and said second reduced cross-sectional area tip tapers away from the second cavity.

15. The security hang tag of claim 13, wherein said first reduced cross-sectional area tip includes a first tongue that tapers away from the first cavity and said second reduced cross-sectional area tip includes a second tongue that tapers away from the second cavity.

16. The security hang tag of claim 12, wherein the head is molded as a single component part.

17. The security hang tag of claim 12, wherein more than one-half of the head extends outwardly from the body.

* * * * *